W. L. AUSTIN.
SWING TRUCK FOR LOCOMOTIVES.
APPLICATION FILED JUNE 26, 1909.
952,402.
Patented Mar. 15, 1910.
2 SHEETS—SHEET 1.
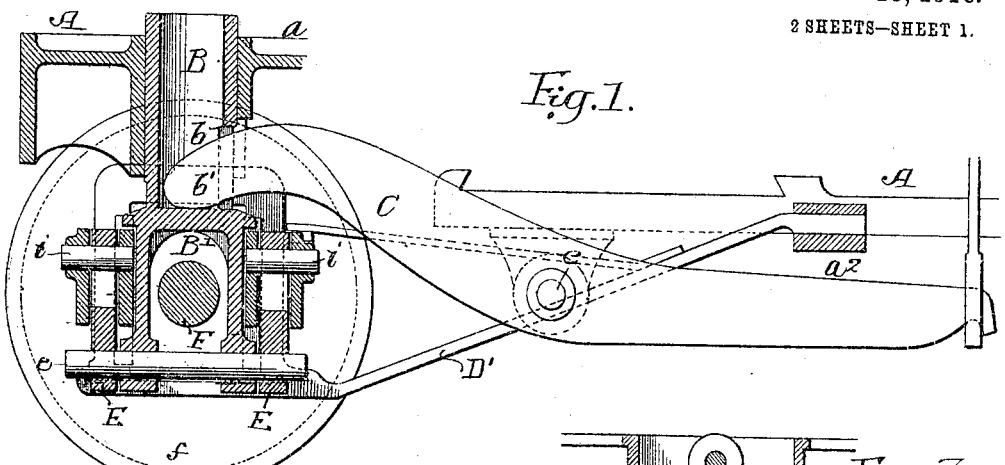
Fig. 1.
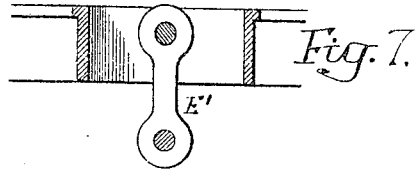
Fig. 7.
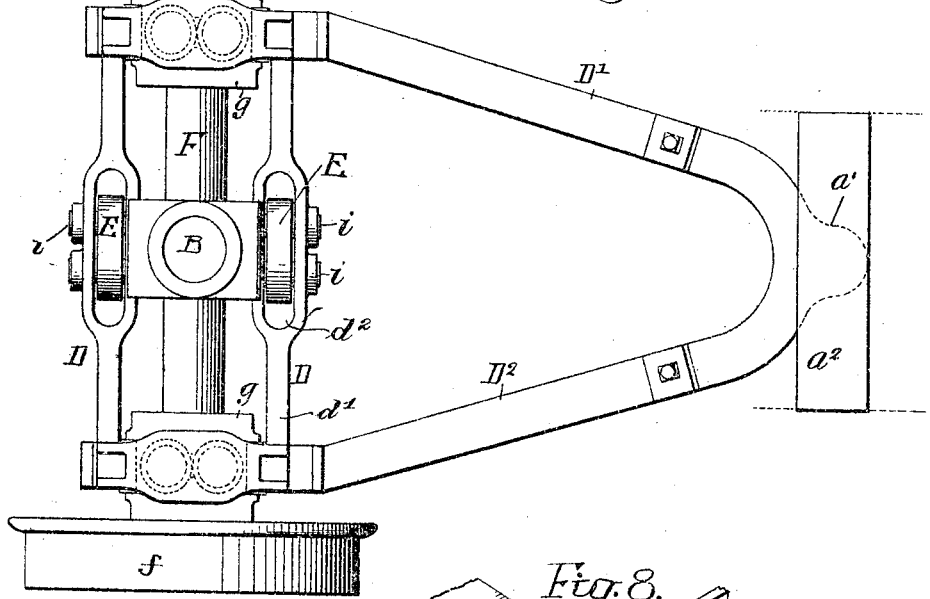
Fig. 2.
Fig. 8.
Witnesses.
Inventor.
William L. Austin.
by his Attorneys.

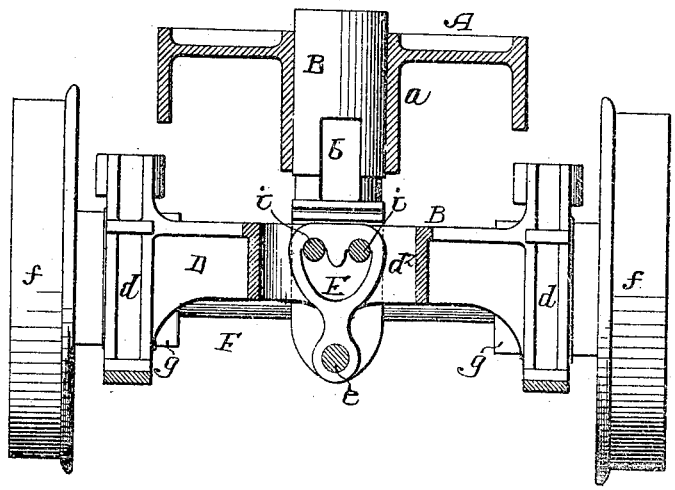
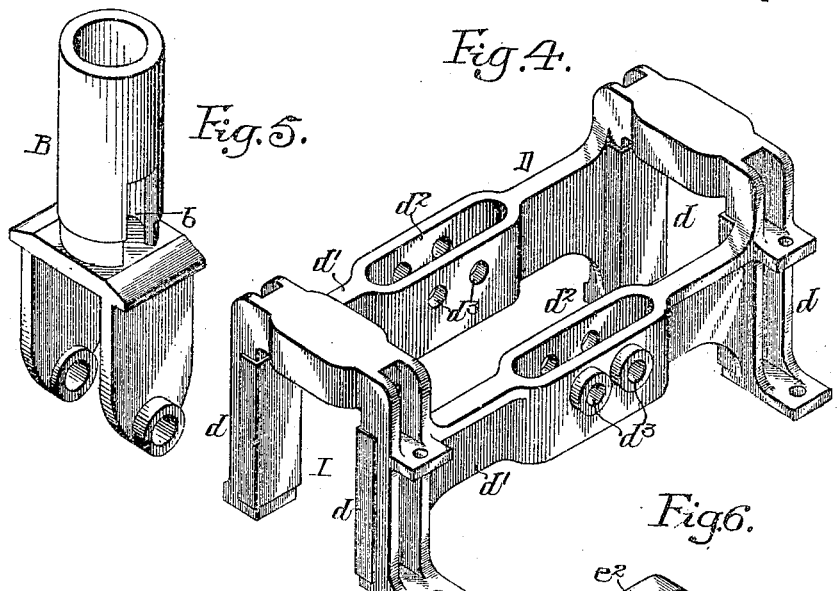
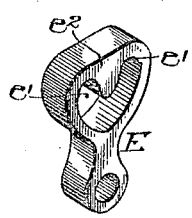

UNITED STATES PATENT OFFICE.

WILLIAM L. AUSTIN, OF PHILADELPHIA, PENNSYLVANIA, ASSIGNOR TO BALDWIN LOCOMOTIVE WORKS, OF PHILADELPHIA, PENNSYLVANIA, A CORPORATION OF PENNSYLVANIA.

SWING-TRUCK FOR LOCOMOTIVES.

952,402.     Specification of Letters Patent.     Patented Mar. 15, 1910.

Application filed June 26, 1909. Serial No. 504,507.

*To all whom it may concern:*

Be it known that I, WILLIAM L. AUSTIN, a citizen of the United States, residing in Philadelphia, Pennsylvania, have invented certain Improvements in Swing-Trucks for Locomotives, of which the following is a specification.

My invention relates to certain improvements in forward swing trucks for locomotives, and the main object of the invention is to reduce the space occupied by the mechanism of the truck and yet allow for the proper swinging of the same to accommodate the curvatures of the track.

A further object is to use a peculiar form of link which will allow the truck to swing, yet when in the center position will steady the truck, as fully described hereafter.

In the accompanying drawings:—Figure 1, is a longitudinal sectional view of the forward swing truck of a locomotive illustrating my invention; Fig. 2, is a plan view of the truck; Fig. 3, is an end view partly in section; Fig. 4, is a perspective view of the truck frame; Fig. 5, is a perspective view of the center pin; Fig. 6, is a perspective view of one of the links; Fig. 7, is a view of a modification; and Fig. 8, is a view of a modification of the frame.

A is the frame of a locomotive having a bearing $a$ for the center pin B, this center pin is made hollow, as shown, and is slotted at $b$ and has a seat $b'$ for the end of the equalizing lever C, which is pivoted at $c$ to a bracket on the main frame of the locomotive and connected at its rear end to the equalizing gear, which may be of any ordinary type.

B' is the head of the center pin, made as shown in Fig. 5, having two arms $b$, $b$ perforated for the reception of the pivot pin $e$ on which are mounted the links E, Fig. 6.

By making a head with the two arms, as shown, I allow for the free passage of the axle F which is adapted to boxes $g$ mounted between the pedestals $d$, $d$ of the truck frame D. The axle has the usual flanged wheels $f$, $f$, the truck frame D is made as clearly shown in Fig. 4, the transverse members $d'$ of the truck frame are preferably arranged in a line with the pedestals $d$, $d$ and have a deep rib which extends well down to the lower portion of the pedestal, strengthening the pedestal as well as steadying the entire truck.

It will be noticed in Fig. 4 that the truck frame is made in a single casting, preferably of steel, and each member $d'$ has a pocket $d^2$ for the reception of the upper portions of the links E and the side walls of these pockets form the bearings $d^3$ for the two pins $i$, $i$ which support the link E. Each link has a single bearing at the lower end for the pin $e$ and two bearings $e'$ at the upper end for the pins $i$, $i$. The bearings $e'$ are separated by depending portions $e^2$. By this construction the links are free to swing on either one or the other of the pins $i$, acting as the pivot pin for the time being, but when the pins are both in the seats they act to steady the truck.

It will be noticed that there is one link forward of the center pin and one pin at the rear of said pin, leaving the balance of the truck entirely free of any mechanism. Heretofore it was the usual practice in suspending the truck frame to utilize four links, but I find that the above construction enables me to dispense with the extra links. The truck frame D is connected to a U-shaped guide frame D', Fig. 2, which extends rearwardly and has a projection adapted to a socket $a'$ in the transverse plate $a^2$, forming part of the main locomotive frame A.

In some instances a plain link may be used, as at E', Fig. 7, and the truck frame may be made of independent pedestals $d^4$ secured to transverse members $d^5$ by bolts or other fastenings, if desired.

By the above construction I make a very light and substantial truck which will allow a clear space each side of the center and the truck can freely swing, and it will be steadied by the parts forming the links, as shown. The truck frame is preferably made in a single piece, preferably of cast steel, thus providing a very light and simple truck structure.

I claim:—

1. The combination in a swing truck for locomotives, of a center pivot pin adapted to a bearing on the frame of the locomotive, the head of said pin being U-shaped so as to extend on each side of the axle of the truck, a truck frame having bearings and two transverse members spaced apart for the passage of the pivot pin, two pins carried by each transverse member, two links, one suspended from pins on one side and the other suspended from pins on the other side, and a pin connecting the lower end of the links with the lower portion of the head of the pivot pin.

2. The combination in a truck, of a pivot pin having a head U-shaped and extending on each side of the axle of the truck, a truck frame having pedestals at each side and two transverse members, a pocket in each transverse member, two pins extending across each pocket, a link adapted to each pair of pins, said link having a double bearing at the upper end and a single bearing at the lower end, and a longitudinal pin extending through the lower portion of the head of the pivot pin adapted to the lower bearings of the links.

3. The combination in a swing truck for locomotives, of a center pin having a U-shaped head extending on each side of and below the axle of the truck, a frame consisting of two pairs of pedestals and two transverse members, each transverse member having a pocket, two links, one forward and the other at the rear of the pivot pin, two pins extending across each pocket of the truck frame, a single pin mounted in the end of the head of the center pin, said pins adapted to the links, the upper portion of the pivot pin being slotted, an equalizing lever extending into the slot, a bearing upon the pivot pin, boxes mounted between the pedestals of the frame, and an axle mounted in the boxes.

4. The combination in a truck, of two pedestals, two transverse members each having a pocket, a center pin having a U-shaped head extending on each side of the axle of the truck, a pin extending across each pocket, a link hung from each pin, and a pin carried by the U-shaped head of the center pin to which the lower ends of the links are connected.

In testimony whereof, I have signed my name to this specification, in the presence of two subscribing witnesses.

WM. L. AUSTIN.

Witnesses:
R. H. SANFORD,
LOUIS H. BENDER.